US010316927B2

(12) United States Patent
Schemer et al.

(10) Patent No.: US 10,316,927 B2
(45) Date of Patent: Jun. 11, 2019

(54) HYDROMOUNT FOR MOUNTING A MOTOR VEHICLE ENGINE

(71) Applicant: Vibracoustic GmbH, Darmstadt (DE)

(72) Inventors: Thomas Schemer, Weinheim (DE); Timo Stoecker, Hemsbach (DE)

(73) Assignee: VIBRACOUSTIC GMBH, Darmstadt (DE)

(*) Notice: Subject to any disclaimer, the term of this patent is extended or adjusted under 35 U.S.C. 154(b) by 0 days.

(21) Appl. No.: 15/553,584

(22) PCT Filed: Sep. 13, 2016

(86) PCT No.: PCT/EP2016/071524
§ 371 (c)(1),
(2) Date: Aug. 25, 2017

(87) PCT Pub. No.: WO2017/063805
PCT Pub. Date: Apr. 20, 2017

(65) Prior Publication Data
US 2018/0045266 A1 Feb. 15, 2018

(30) Foreign Application Priority Data
Oct. 12, 2015 (EP) .................... 15189374.0

(51) Int. Cl.
F16F 13/10 (2006.01)
F16F 13/26 (2006.01)

(52) U.S. Cl.
CPC .......... *F16F 13/106* (2013.01); *F16F 13/105* (2013.01); *F16F 13/26* (2013.01); *F16F 2226/045* (2013.01)

(58) Field of Classification Search
CPC ........ F16F 13/10; F16F 13/102; F16F 13/103; F16F 13/105; F16F 13/106
USPC ............ 267/140.11, 140.12, 140.13, 140.14, 267/140.15
See application file for complete search history.

(56) References Cited

U.S. PATENT DOCUMENTS 4,588,173 A * 5/1986 Gold ................... F16F 13/10
267/140.13
4,783,062 A * 11/1988 Hamberg ............ F16F 13/262
248/566

(Continued)

FOREIGN PATENT DOCUMENTS

EP 0142943 A2 5/1985
EP 0737825 A1 10/1996
FR 2708695 A1 * 2/1995 ............ F16F 13/105

*Primary Examiner* — Thomas J Williams
(74) *Attorney, Agent, or Firm* — Leydig, Voit & Mayer, Ltd.

(57) ABSTRACT

A hydromount for mounting a motor vehicle engine includes a load-bearing spring having an elastomeric material and being configured to support a mount core. A working chamber is delimited by the load-bearing spring. An equalization chamber is separated by an intermediate plate from the working chamber and delimited by an equalization membrane having an elastomeric material. The working chamber and the equalization chamber are filled with a hydraulic liquid and connected to each other by a damping channel. The intermediate plate is mounted in an elastic receiving device which grasps around the intermediate plate and has a pivotable supporting region.

11 Claims, 3 Drawing Sheets

(56) References Cited

U.S. PATENT DOCUMENTS

| | | | | |
|---|---|---|---|---|
| 4,783,063 A | * | 11/1988 | Probst | F16F 13/105 |
| | | | | 267/140.13 |
| 4,901,986 A | * | 2/1990 | Smith | F16F 13/10 |
| | | | | 248/550 |
| 8,894,051 B2 | * | 11/2014 | Yamamoto | F16F 13/106 |
| | | | | 267/140.13 |
| 2018/0291978 A1 | * | 10/2018 | Vollmann | F16F 13/106 |

\* cited by examiner

HYDROMOUNT FOR MOUNTING A MOTOR VEHICLE ENGINE

CROSS-REFERENCE TO PRIOR APPLICATIONS

This application is a U.S. National Stage Application under 35 U.S.C. § 371 of International Application No. PCT/EP2016/071524 filed on Sep. 13, 2016, and claims benefit to European Patent Application No. EP 15189374.0 filed on Oct. 12, 2015. The International Application was published in German on Apr. 20, 2017 as WO 2017/063805 A1 under PCT Article 21(2).

FIELD

The present invention relates to a hydromount, in particular for mounting a motor vehicle engine, comprising a load-bearing spring consisting of an elastomeric material for supporting a mount core, a working chamber delimited by the load-bearing spring, an equalization chamber, which is separated by an intermediate plate from the working chamber and delimited by an equalization membrane consisting of an elastomeric material, wherein the working chamber and the equalization chamber are filled with a hydraulic liquid and connected to each other by a damping channel. Further, the invention relates to a method for installing an intermediate plate in a cup-shaped cap or in a housing of such a hydromount.

BACKGROUND

Such hydraulically damping mounts are used particularly for supporting a motor vehicle engine on a vehicle body in order to, on the one hand, dampen the vibrations caused by road bumps and, on the other hand, to provide insulation against acoustic vibrations. The vibrations caused by road bumps are dampened by a hydraulic system, with the hydraulic system being formed by the liquid-filled working chamber, the equalization chamber and the damping channel interconnecting the two chambers. The mode of operation of the hydraulic system can be described as follows. The working chamber is made larger or smaller by a movement of the load-bearing spring, with the liquid located in the working chamber being pressed via the damping channel into the equalization chamber. The liquid oscillating in the damping channel causes a damping action.

SUMMARY

In an embodiment, the present invention provides a hydromount for mounting a motor vehicle engine. A load-bearing spring has an elastomeric material and is configured to support a mount core. A working chamber is delimited by the load-bearing spring. An equalization chamber is separated by an intermediate plate from the working chamber and delimited by an equalization membrane having an elastomeric material. The working chamber and the equalization chamber are filled with a hydraulic liquid and connected to each other by a damping channel. The intermediate plate is mounted in an elastic receiving device which grasps around the intermediate plate and has a pivotable supporting region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
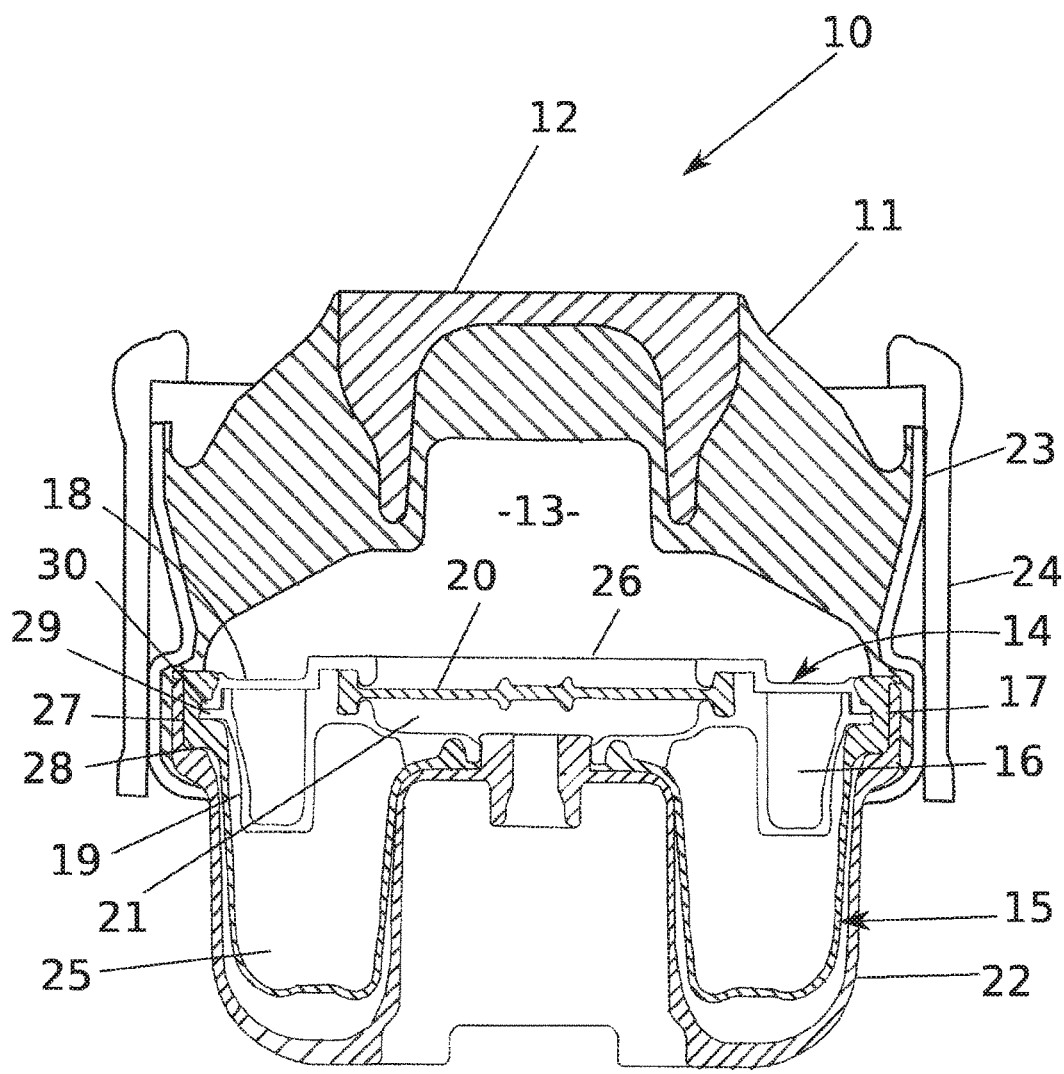
FIG. 1 shows a vertical section through a hydromount according to an embodiment of the invention.

It is recognized according to an embodiment of the present invention that hydromounts of the type described above are prone to a high level of dynamic hardening in high-frequency ranges, which may result in adverse acoustic effects. It is further recognized according to an embodiment of the present invention that absorbers, which are fitted in the vehicle or in the mount, may serve as a remedy.

An aspect of the invention improves, in a hydromount of the type described above, the damping properties in the high-frequency range with a simple structure and simple assembly.

For accomplishing this, an embodiment of the invention provides, in a hydromount of the type described above, that the intermediate plate is mounted in an elastic receiving device grasping around the intermediate plate and having a pivotable supporting region.

In a hydromount according to an embodiment of the invention, the intermediate plate, in the fitted state, is enclosed completely at the edges by the elastic receiving device. Due to the soft mounting of the intermediate plate, the intermediate plate acts as an absorber and is capable of absorbing the arising high-frequency vibrations. Furthermore, the intermediate plate is completely decoupled from the housing, so that insulation is provided against the arising vibrations. Due to the pivotably disposed supporting region, the receiving device may have an undercut that results in a complete enclosure of the intermediate plate in the closed position of the receiving device.

In an advantageous embodiment y, the receiving device is configured in an annular manner. Here, the dimensions of the receiving device are adapted to the outer dimension of the intermediate plate.

The receiving device may have an annular groove accommodating a radially protruding annular collar of the intermediate plate. In the closed position of the elastic receiving device, the annular collar is enclosed by the supporting regions of the receiving device.

In an advantageous embodiment, the receiving device has a first supporting region and a second supporting region, which are disposed so as to be pivotably movable relative to each other.

In an advantageous embodiment, the receiving device has projections protruding in the axial direction, which are disposed offset from each other in the circumferential direction. The rigidity of the elastic receiving device can be adjusted in a simple manner with the projections. Here, the projections may be provided on both supporting regions.

In an advantageous embodiment, the receiving device is configured to be integral with the equalization membrane. The structure of the hydromount is thus simplified.

The receiving device and the equalization membrane can be produced as an integral vulcanization component from an elastomeric material.

In an advantageous embodiment, the equalization membrane is accommodated in a cup-shaped cap having a radially stepped edge region for accommodating the receiving device.

In order to achieve as great a decoupling effect as possible, the frontal area of the cap is covered by a radial boss of the elastic receiving device.

In an advantageous embodiment, the load-bearing spring is attached by vulcanization to a supporting device having an attaching portion fixed to the cap. In this case, attachment can be effected, for example, by beading over the supporting portion on the cap.

In an advantageous embodiment, the hydromount has a housing accommodating the load-bearing spring.

Further, an embodiment of the invention provides a method for installing an intermediate plate in a cup-shaped cap or in a housing of a hydromount according to any one of the preceding claims. The method includes the following steps:
a) providing a cup or a housing for accommodating the elastic receiving device;
b) inserting the intermediate plate into the opened receiving device, wherein the intermediate plate rests on a first supporting region of the receiving device;
c) pressing the intermediate plate and the equalization membrane into the cap or the housing, wherein the second supporting region of the receiving device pivots inwards and grasps around the intermediate plate.

Thus, in the closed position of the receiving device, the edge region of the intermediate plate is completely enclosed by the receiving device. A soft mounting of the intermediate plate is thus obtained, providing an absorber function. Furthermore, the intermediate plate is completely decoupled or insulated from a cup-shaped cap of a housing.

FIG. 1 illustrates a hydromount 10 for mounting a motor vehicle engine on a vehicle body. The hydromount 10 has a load-bearing spring 11 consisting of an elastomeric material for supporting a mount core 12 vulcanized thereinto. The engine is attached to the mount core 12.

The load-bearing spring 11 delimits a working chamber 13, which is separated from an equalization chamber 25 by means of an intermediate plate 14. The equalization chamber 25 is delimited by an equalization membrane 15, which is also referred to as a roller bellows. The chambers 13 and 25 are filled with a hydraulic liquid and connected to each other via a damping channel 16 incorporated into the intermediate plate 14.

The intermediate plate 14 has a cap part 18 and a base part 15, into which the damping channel 16 is molded. The cap part 18 and the base part 19 are made from plastic. A decoupling chamber 21, in which a decoupling membrane 20 is accommodated, is provided in the intermediate plate 21. The decoupling chamber 21 is in connection with the working chamber 13 via an opening 26.

The equalization membrane 15 has an receiving device 17, which is configured to be integral with the equalization membrane 15. The equalization membrane 15 is produced as an integral vulcanization component from an elastomeric material.

An annular collar 29, which is accommodated in an annular groove 30 of the receiving device 17, protrudes from the intermediate plate 14.

A detailed configuration of the receiving device 17 is described below with reference to the FIGS. 2 to 4.

Figure 2:
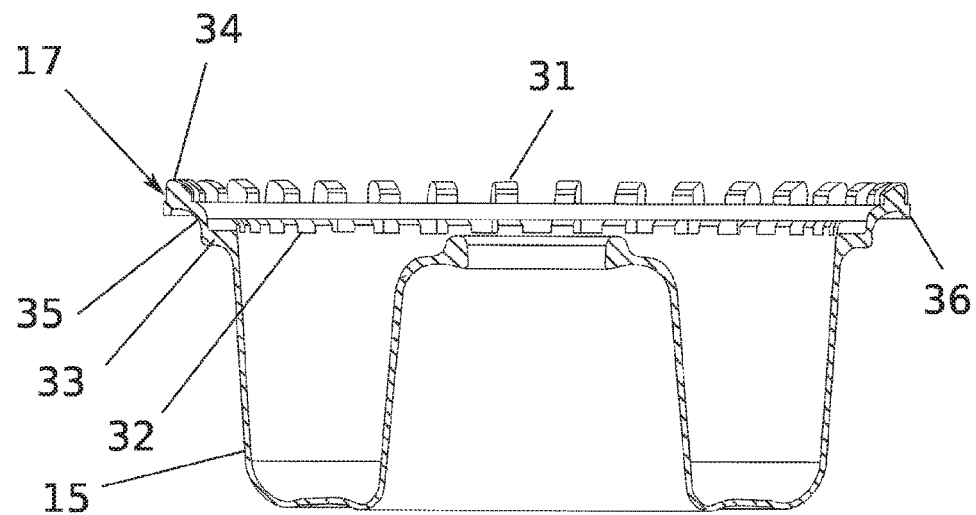
FIG. 2 shows a perspective view of the receiving device with the integrated equalization membrane.
Figure 4:
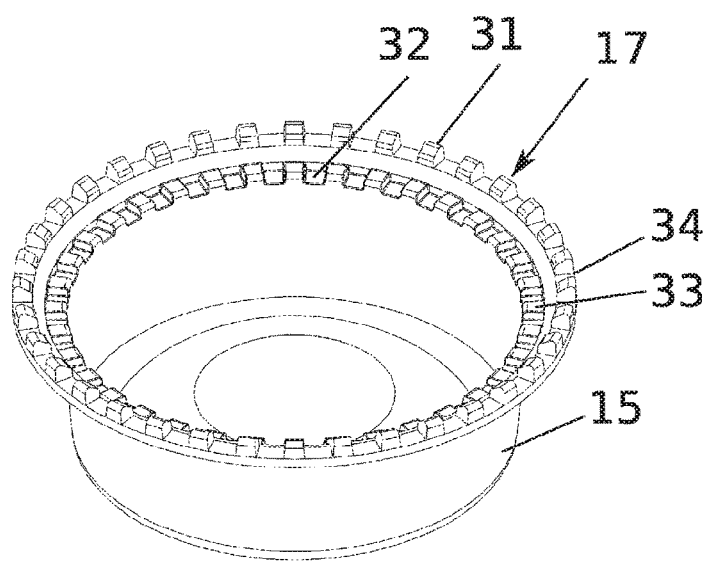
FIG. 4 shows a vertical section through the receiving device in its closed position.

FIGS. 2 and 4 show the receiving device 17 with the integrated equalization membrane 15 in the open position of the receiving device 17. The receiving device 17 is configured in an annular manner and has projections 31 and 32 which are disposed in an offset manner in the circumferential direction and protrude in the axial direction. The projections 31, 32 effect a particularly soft mounting of the intermediate plate 14, with the rigidity being adjustable via the configuration of the projections, in particular their number.

The equalization membrane 15, which is configured as a roller bellows, is integrally attached by vulcanization to the receiving device 17.

The receiving device 17 has a first supporting region 33, which is connected to a second supporting region 34 via a connecting portion 35. The projections 32 protrude from the first supporting region 33, and the projections 31 protrude from the second supporting region 34, in each case in the axial direction. A radial boss 36 protrudes at the open front side.

Figure 3:
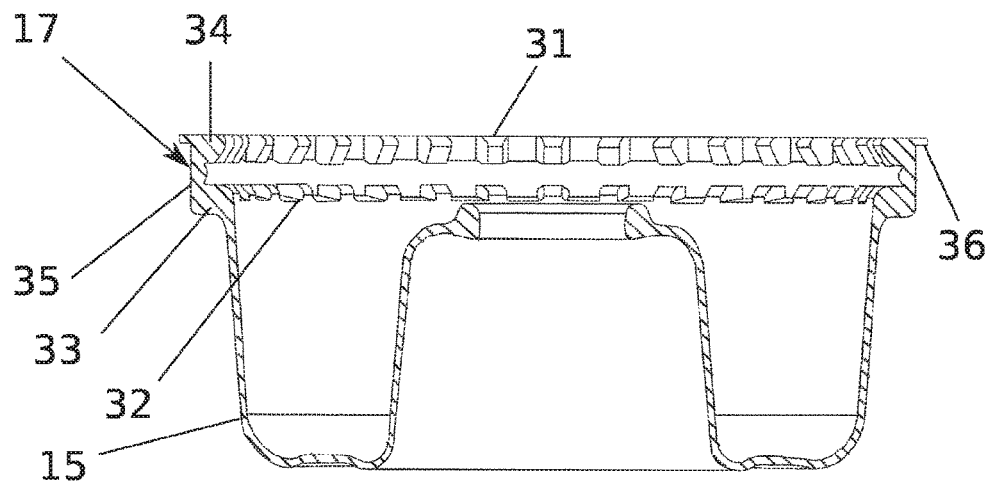
FIG. 3 shows a vertical section through the receiving device in its open position.

FIG. 3 shows the receiving device 17 in its closed position. In this position, the second supporting region 34, which is disposed in a pivotably movable manner, is pivoted radially inwards. Thus, an annular groove 30, which accommodates the annular collar 29 of the intermediate plate, is formed on the supporting device 17.

The installation of the intermediate plate on the cup-shaped cap 22 is to be described with reference to FIG. 5. In this case, the left half of FIG. 5 shows the mounting situation in the open position of the receiving device 17, whereas the right half of FIG. 5 shows the mounting situation of the receiving device 17 in its closed position.

First, the receiving device 17 with the equalization membrane 15 attached thereto by vulcanization is placed into the cup-shaped cap 22. In this case, the second supporting region 34, which is disposed in a pivotably movable manner, is folded outwards. The first supporting region 33 is positioned at a distance from the shoulder 28 of the cap 22.

Figure 5:
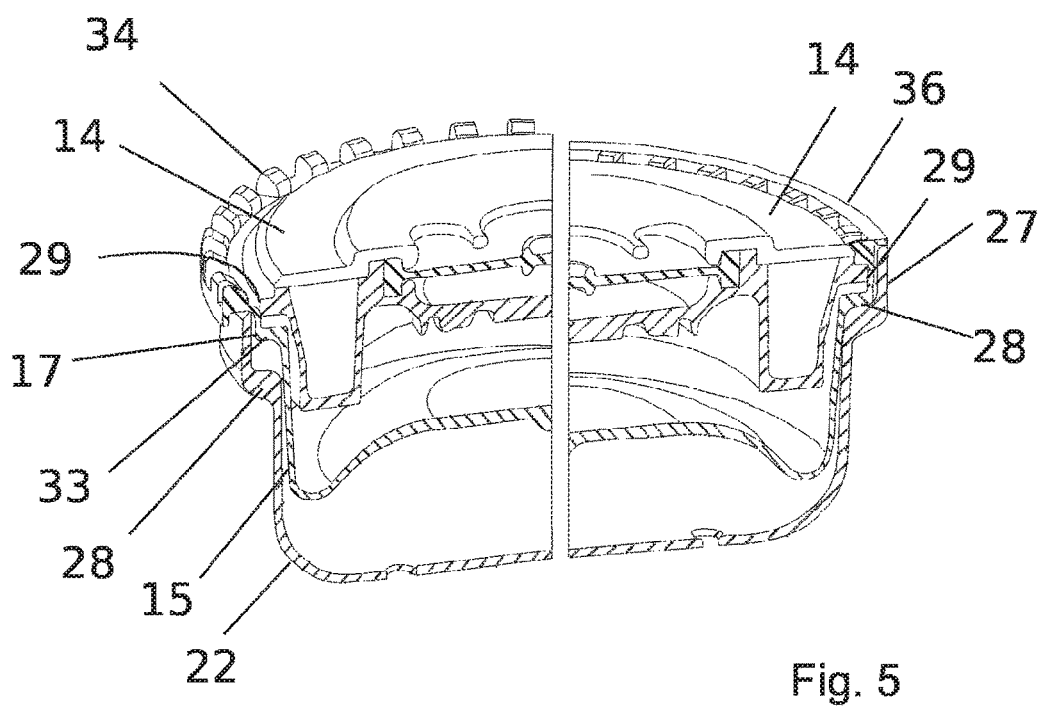
FIG. 5 shows a vertical section through the intermediate plate and the receiving device in the open position and in the closed position of the receiving device.

The right-hand illustration of FIG. 5 shows the receiving device 17 in its closed position. When the intermediate plate 14 is pressed down into the cup-shaped cap 22, the first supporting region 33 rests on the shoulder 28 of the cap 22. The edge region 27 pivots the second supporting region 34 of the receiving device 17 inwards when the intermediate plate 14 is pressed down. The intermediate plate 14 is thereby grasped by the supporting region 34 disposed in a pivotably movable manner.

Thus, the edge region of the intermediate plate 14 is completely enclosed by the supporting device 17. In the closed position, the radial boss 36 of the supporting device 17 rests on the front side of the edge region 27.

The receiving device 17 effects a soft mounting of the intermediate plate 14 in the hydromount 10. An absorber function of the intermediate plate is thus obtained, by means of which the high-frequency vibrations can be absorbed. In addition, the elastic receiving device causes a complete decoupling of the intermediate plate 14, whereby insulation can be provided against any vibrations arising.

Since the receiving device 17 is produced as an integral vulcanization component with the equalization membrane 15, the production and assembly is particularly simple. The assembly can be carried out in an automated manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

10 Hydromount
11 Load-bearing spring
12 Mount core
13 Working chamber
14 Intermediate plate
15 Equalization membrane
16 Damping channel
17 Receiving device
18 Cap part
19 Cap part
20 Decoupling membrane
21 Decoupling chamber
22 Cap
23 Supporting device
24 Housing
25 Equalization chamber
26 Opening
27 Edge region
28 Shoulder
29 Annular collar
30 Annular groove
31 Projection
32 Projection
33 First supporting region
34 Second supporting region
35 Connecting collar
36 Radial boss

The invention claimed is:

1. A hydromount for mounting a motor vehicle engine, the hydromount comprising:
a load-bearing spring having an elastomeric material and being configured to support a mount core;
a working chamber delimited by the load-bearing spring; and
an equalization chamber, which is separated by an intermediate plate from the working chamber and delimited by an equalization membrane having an elastomeric material, the working chamber and the equalization chamber being filled with a hydraulic liquid and connected to each other by a damping channel,
wherein the intermediate plate is mounted in an elastic receiving device which grasps around the intermediate plate and has a pivotable supporting region, and
wherein the receiving device has projections protruding in the axial direction, which are disposed offset from each other in the circumferential direction.

2. The hydromount according to claim 1, wherein the receiving device is configured in an annular manner.

3. The hydromount according to claim 1, wherein the receiving device has an annular groove accommodating a radially protruding annular collar of the intermediate plate.

4. The hydromount according to claim 1, wherein the receiving device has a first supporting region and a second supporting region, which are disposed so as to be pivotably movable relative to each other.

5. The hydromount according to claim 1, wherein the receiving device is configured to be integral with the equalization membrane.

6. The hydromount according to claim 5, wherein the receiving device and the equalization membrane are produced as an integral vulcanization component from the elastomeric material.

7. The hydromount according to claim 1, wherein the equalization membrane is accommodated in a cup-shaped cap having a radially stepped edge region configured to accommodate the receiving device.

8. The hydromount according to claim 1, wherein a frontal area of the cap is covered by a radial boss of the elastic receiving device.

9. The hydromount according to claim 1, wherein the load-bearing spring is attached by vulcanization to a supporting device having an attaching portion fixed to the cap.

10. The hydromount according to claim 1, further comprising a housing that accommodates the load-bearing spring.

11. A method for fitting an intermediate plate in a cup-shaped cap or in a housing of a hydromount, the method comprising:
providing the intermediate plate;
providing the hydromount, which comprises:
a load-bearing spring having an elastomeric material and being configured to support a mount core;
a working chamber delimited by the load-bearing spring; and
an equalization chamber, which is separatable by the intermediate plate from the working chamber and delimited by an equalization membrane having an elastomeric material, the working chamber and the equalization chamber being fillable with a hydraulic liquid and connectable to each other by a damping channel,
wherein the intermediate plate is mountable in an elastic receiving device so as to grasp around the intermediate plate and has a pivotable supporting region, and
wherein the receiving device has projections protruding in the axial direction, which are disposed offset from each other in the circumferential direction,
providing the cap or the housing for accommodating the elastic receiving device;

inserting the intermediate plate into the receiving device in an opened state of the receiving device such that the intermediate plate rests on a first supporting region of the receiving device; and pressing the intermediate plate and the equalization membrane into the cap or the housing such that the second supporting region of the receiving device pivots inwards and grasps around the intermediate plate.

* * * * *